(12) United States Patent
Takeshige et al.

(10) Patent No.: US 11,738,843 B2
(45) Date of Patent: Aug. 29, 2023

(54) SHIFT DEVICE FOR OUTBOARD MOTOR

(71) Applicant: HONDA MOTOR CO., LTD., Tokyo (JP)

(72) Inventors: Takamasa Takeshige, Saitama (JP); Naoki Aikawa, Saitama (JP); Tomohiro Miyauchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 379 days.

(21) Appl. No.: 17/191,111

(22) Filed: Mar. 3, 2021

(65) Prior Publication Data
US 2021/0291950 A1 Sep. 23, 2021

(30) Foreign Application Priority Data

Mar. 19, 2020 (JP) ................................. 2020-048643

(51) Int. Cl.
| | |
|---|---|
| *B63H 21/21* | (2006.01) |
| *B63H 20/14* | (2006.01) |
| *F16D 11/14* | (2006.01) |
| *F16H 61/02* | (2006.01) |
| *F16H 61/28* | (2006.01) |
| *F16H 59/04* | (2006.01) |

(52) U.S. Cl.
CPC ............. *B63H 21/21* (2013.01); *B63H 20/14* (2013.01); *F16D 11/14* (2013.01); *F16H 59/044* (2013.01); *F16H 61/0246* (2013.01); *F16H 61/0248* (2013.01); *F16H 61/2807* (2013.01); *B63H 2021/216* (2013.01)

(58) Field of Classification Search
CPC .. B63H 21/21; B63H 20/14; B63H 2021/216; F16D 11/14; F16H 59/044; F16H 61/0246; F16H 61/0248; F16H 61/2807
See application file for complete search history.

(56) References Cited

U.S. PATENT DOCUMENTS

| | | | | |
|---|---|---|---|---|
| 4,525,149 A | * | 6/1985 | Broughton ............. | B63H 23/30 440/86 |
| 5,050,461 A | * | 9/1991 | Onoue ................... | B63H 20/20 440/86 |
| 2008/0201031 A1 | * | 8/2008 | Ito ........................ | B63H 21/213 701/21 |
| 2020/0140050 A1 | * | 5/2020 | Mizutani ............... | B63H 21/22 |

FOREIGN PATENT DOCUMENTS

JP 2006-321262 A 11/2006

* cited by examiner

*Primary Examiner* — Stephen P Avila
(74) *Attorney, Agent, or Firm* — Armstrong Teasdale LLP

(57) ABSTRACT

A shift device for an outboard motor includes a forward gear and a reverse gear; a clutch gear; a shift actuator configured to move between a neutral reference position where the clutch gear is disengaged from the forward gear and the reverse gear and an engagement reference position where the clutch gear is engaged with the forward gear or the reverse gear; and a control device configured to control a movement of the shift actuator. The control device is configured to set an intermediate target position, and to set a speed at which the shift actuator moves from the intermediate target position to the engagement reference position slower than a speed at which the shift actuator moves from the neutral reference position to the intermediate target position.

10 Claims, 7 Drawing Sheets

SHIFT DEVICE FOR OUTBOARD MOTOR

TECHNICAL FIELD

The present invention relates to a shift device for an outboard motor.

BACKGROUND ART

Conventionally, as a shift device for an outboard motor, a shift device of the drive-by-wire type (hereinafter referred to as "the DBW type") has been proposed. In such a shift device of the DBW type, a shift position of the outboard motor is changed according to an electric signal from an operation device operated by a user (see JP2006-321262A).

For example, the shift device of the DBW type includes a forward gear and a reverse gear arranged so as to face each other, a clutch gear arranged between the forward gear and the reverse gear, and a shift actuator configured to move between one position where the clutch gear is disengaged from the forward gear and the reverse gear and another position where the clutch gear is engaged with the forward gear or the reverse gear. The shift actuator moves between the above plural positions according to the electric signal from the operation device, so that the shift position of the outboard motor is changed between a neutral position, a forward position, and a reverse position.

Normally, the position of the clutch gear is set such that the clutch gear is engaged with the forward gear or the reverse gear with an appropriate engagement width. However, in a case where a shift sensor, which is configured to detect the position of the shift actuator, indirectly detects the position of the clutch gear, the clutch gear may not be engaged with the forward gear or the reverse gear with an appropriate engagement width due to various factors (for example, tolerance of the members arranged between the shift actuator and the clutch gear, aging in the shape of the above members, and variation in the assembly positions of the above members and the shift sensor).

SUMMARY OF THE INVENTION

In view of such a problem of the prior art, a primary object of the present invention is to provide a shift device for an outboard motor that can engage the clutch gear with the forward gear or the reverse gear with an appropriate engagement width.

To achieve such an object, one embodiment of the present invention provides a shift device (10) for an outboard motor (1) including: a forward gear (30) and a reverse gear (31) arranged so as to face each other; a clutch gear (32) arranged between the forward gear and the reverse gear; a shift actuator (43) configured to move between a neutral reference position where the clutch gear is disengaged from the forward gear and the reverse gear and an engagement reference position where the clutch gear is engaged with the forward gear or the reverse gear; and a control device (28) configured to control a movement of the shift actuator, wherein the control device is configured to set an intermediate target position between the neutral reference position and the engagement reference position, and to set a speed at which the shift actuator moves from the intermediate target position to the engagement reference position slower than a speed at which the shift actuator moves from the neutral reference position to the intermediate target position.

According to this arrangement, the shift actuator can be moved slowly from the intermediate target position to the engagement reference position, while being moved quickly from the neutral reference position to the intermediate target position. Accordingly, the shift actuator can be stopped at an appropriate position, so that the clutch gear can be engaged with the forward gear or the reverse gear with an appropriate engagement width.

In the above arrangement, preferably, the intermediate target position is a position where engagement of the clutch gear with the forward gear or the reverse gear is started.

According to this arrangement, the shift actuator can be decelerated when the engagement of the clutch gear with the forward gear or the reverse gear is started. Accordingly, the clutch gear can be engaged with the forward gear or the reverse gear reliably and smoothly, so that the clutch gear, the forward gear, and the reverse gear can be prevented from being damaged.

In the above arrangement, preferably, the intermediate target position is a position immediately before engagement of the clutch gear with the forward gear or the reverse gear is started.

According to this arrangement, the shift actuator can be decelerated immediately before the engagement of the clutch gear with the forward gear or the reverse gear is started. Accordingly, the clutch gear can be engaged with the forward gear or the reverse gear reliably and smoothly, so that the clutch gear, the forward gear, and the reverse gear can be prevented from being damaged.

In the above arrangement, preferably, the shift device further includes a shift sensor (44) configured to directly detect a position of the shift actuator, wherein the control device is configured to identify the position of the shift actuator based on a signal from the shift sensor.

According to this arrangement, the position of the shift actuator can be identified accurately. Accordingly, the shift actuator can be stopped at a more appropriate position, so that the clutch gear can be engaged with the forward gear or the reverse gear with a more appropriate engagement width.

In the above arrangement, preferably, the engagement reference position is a position where an engagement width with which the clutch gear is engaged with the forward gear or the reverse gear is maximized.

According to this arrangement, the clutch gear can be reliably prevented from being inadvertently disengaged from the forward gear or the reverse gear in a state where the shift actuator is in the engagement reference position.

In the above arrangement, preferably, the shift device further includes: a shift slider (33) coupled to the clutch gear; and a link mechanism (46) connecting the shift actuator and the shift slider, wherein the control device keeps on moving the shift actuator by a length corresponding to a deflection amount of the link mechanism after the shift actuator moves from the neutral reference position to the engagement reference position.

According to this arrangement, the shift actuator can be reliably moved to a position where the engagement width with which the clutch gear is engaged with the forward gear or the reverse gear is maximized, even if the assembly positions of the components of the shift device vary or the shapes of the above components change over time. Accordingly, the clutch gear can be more reliably prevented from being inadvertently disengaged from the forward gear or the reverse gear in a state where the shift actuator is in the engagement reference position.

In the above arrangement, preferably, the control device is configured to set an engagement maintenance position between the engagement reference position and a position where the engagement of the clutch gear with the forward gear or the reverse gear is started, and in a case where the shift actuator moves from the engagement reference position to the engagement maintenance position without any relationship with a command signal from the control device, the control device restores the shift actuator from the engagement maintenance position to the engagement reference position.

According to this arrangement, the clutch gear can be reliably prevented from being inadvertently disengaged from the forward gear or the reverse gear due to an external force.

In the above arrangement, preferably, the shift device further includes a shift motor (45) configured to move the shift actuator, wherein the control device is configured to set a duty ratio of the shift motor during a movement of the shift actuator from the intermediate target position to the engagement reference position lower than a duty ratio of the shift motor during a movement of the shift actuator from the neutral reference position to the intermediate target position.

According to this arrangement, the movement speed of the shift actuator can be controlled easily and accurately.

In the above arrangement, preferably, the control device is configured to set a speed at which the shift actuator moves from the engagement reference position to the intermediate target position slower than a speed at which the shift actuator moves from the intermediate target position to the neutral reference position.

According to this arrangement, the clutch gear can be smoothly disengaged from the forward gear or the reverse gear.

In the above arrangement, preferably, the control device is configured to control the movement of the shift actuator according to an electric signal from an operation device (57) configured to accept an input operation by a user.

According to this arrangement, in the shift device of the drive-by-wire type, the clutch gear can be engaged with the forward gear or the reverse gear with an appropriate engagement width.

Thus, according to the above arrangements, it is possible to provide a shift device for an outboard motor that can engage the clutch gear with the forward gear or the reverse gear with an appropriate engagement width.

DESCRIPTION OF THE PREFERRED EMBODIMENT(S)

In the following, an outboard motor 1 according to an embodiment of the present invention will be described with reference to the drawings. In the following, directional terms such as front, rear, upper, lower, left, or right will be used based on a state where the longitudinal direction of the outboard motor 1 matches the vertical direction (see FIG. 1). Arrows Fr, Re, U, Lo, L, and R appropriately attached to each figure indicate a front side, a rear side, an upper side, a lower side, a left side, and a right side of the outboard motor 1, respectively.

<The Configuration of the Outboard Motor 1>

Figure 1:
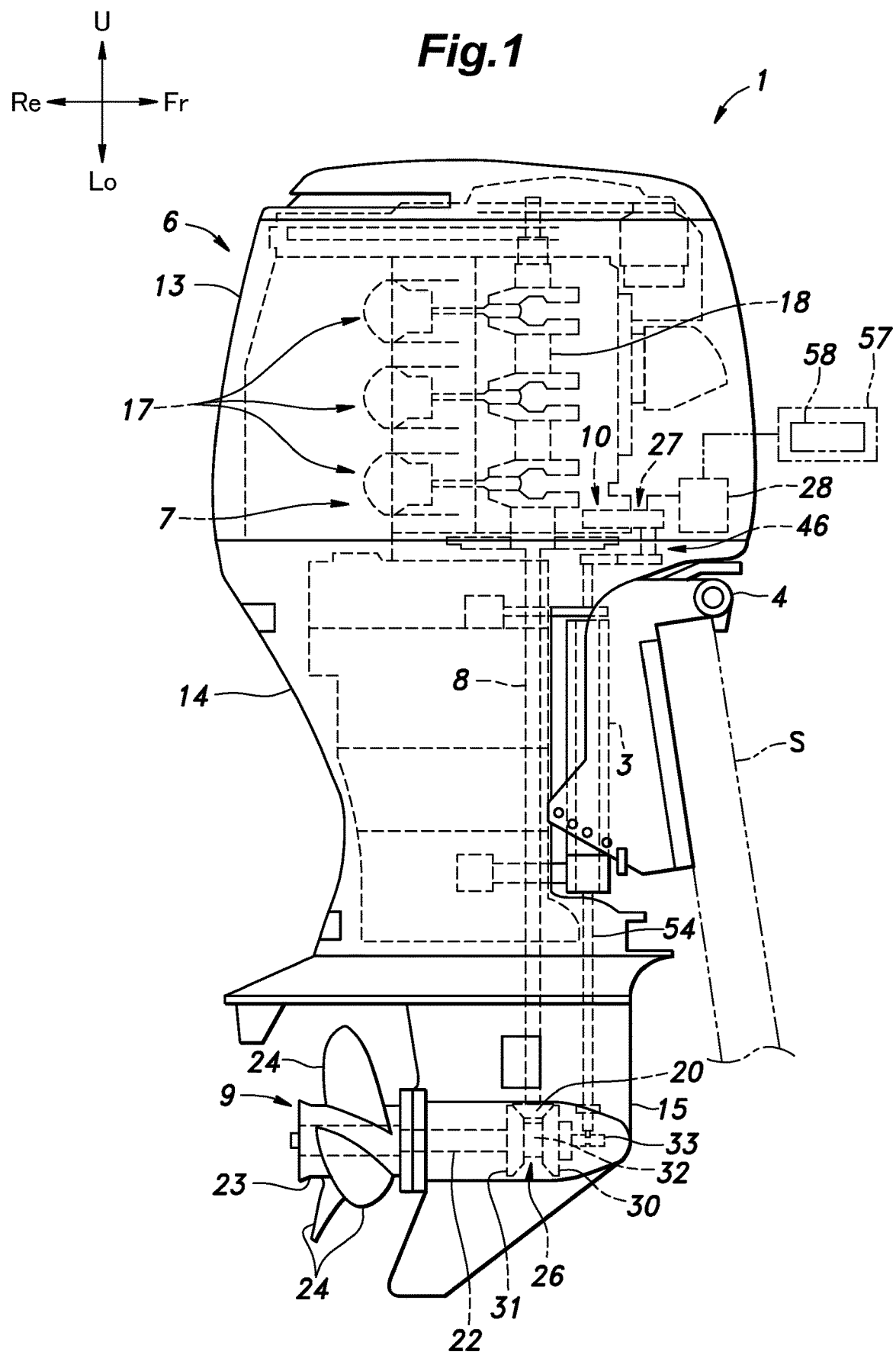
FIG. 1 is a side view showing an outboard motor according to an embodiment of the present invention.

As shown in FIG. 1, the outboard motor 1 is attached to the stem of a hull S in order to promote the hull S according to an operation by a user (operator). The outboard motor 1 is configured to swing left and right around a swivel shaft 3 and to tilt up and down around a tilt shaft 4.

The outboard motor 1 includes a cover 6, an engine 7 (internal combustion engine), a driveshaft 8, a propeller 9, and a shift device 10. In the following, these components of the outboard motor 1 will be described one by one.

The cover 6 has a box-like shape elongated in the up-and-down direction. The cover 6 includes an engine case 13, a main case 14 arranged below the engine case 13, and a gear case 15 arranged below the main case 14.

The engine 7 is housed in the engine case 13 of the cover 6. For example, the engine 7 is a V-type engine including plural cylinders 17 aligned in the up-and-down direction. In another embodiment, the engine 7 may be a multicylinder engine other than the V-type engine, or may be a single cylinder engine. The engine 7 includes a crankshaft 18 extending in the up-and-down direction.

The driveshaft 8 is housed in the main case 14 and the gear case 15 of the cover 6, and extends in the up-and-down direction. An upper end of the driveshaft 8 is connected to the crankshaft 18 of the engine 7. A drive gear 20 is provided at a lower end of the driveshaft 8.

The propeller 9 is rotatably attached to the gear case 15 of the cover 6. The propeller 9 includes a propeller shaft 22 extending in the fore and aft direction and a propeller body 23 fixed to an outer circumference of a rear part of the propeller shaft 22. A front part of the propeller shaft 22 is housed in the gear case 15. A rear part of the propeller shaft 22 and the propeller body 23 are exposed to an outside of the gear case 15. Plural fins 24 protrude from an outer circumferential surface of the propeller body 23.

The shift device 10 includes a clutch mechanism 26, a shift mechanism 27 connected to the clutch mechanism 26, and a control device 28 configured to control the shift mechanism 27.

Figure 2:
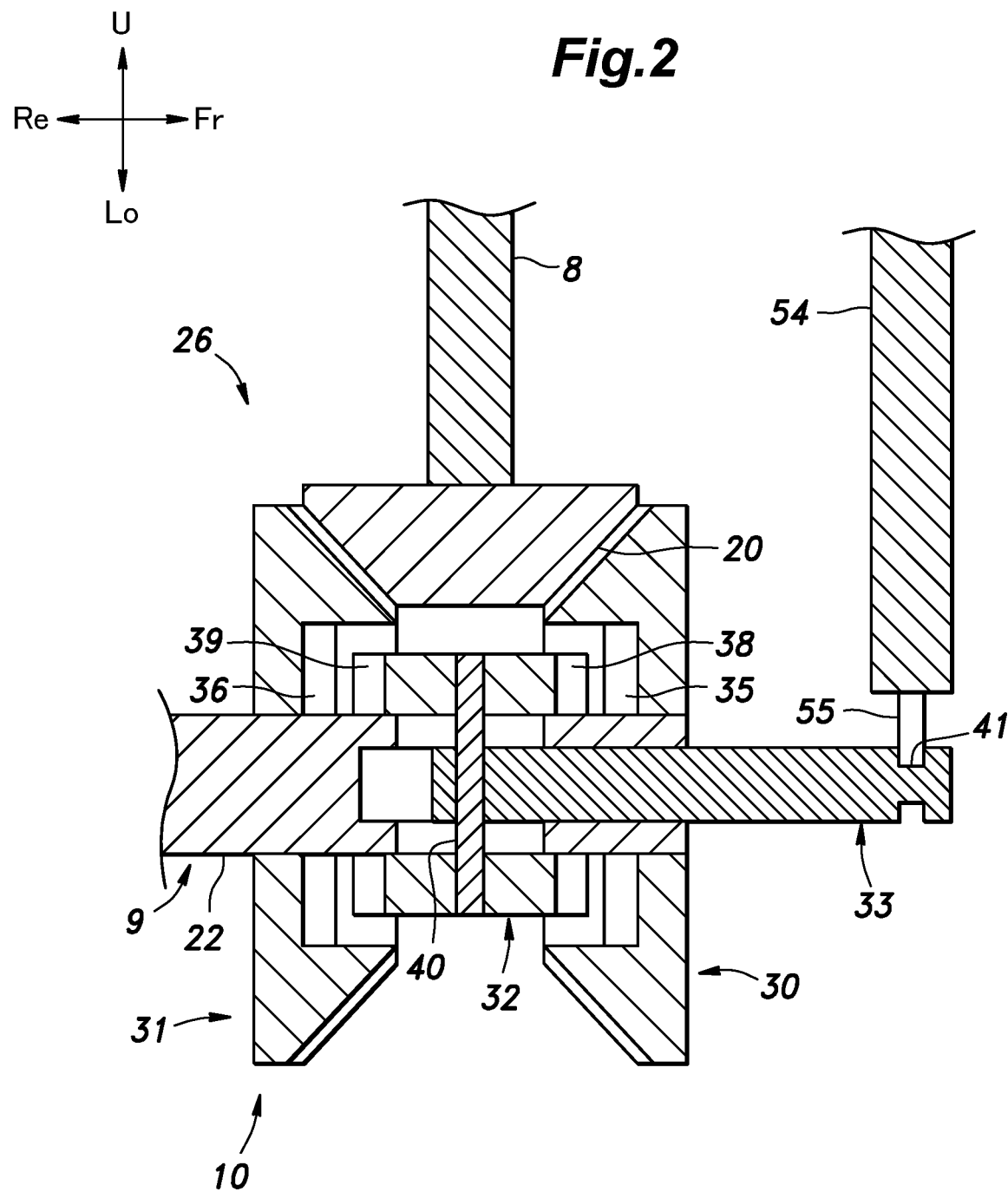
FIG. 2 is a sectional view showing a clutch mechanism of a shift device according to the embodiment of the present invention.

The clutch mechanism 26 of the shift device 10 is housed in the gear case 15. The clutch mechanism 26 consists of the so-called dog clutch. As shown in FIG. 2, the clutch mechanism 26 includes a forward gear 30 and a reverse gear 31 arranged so as to face each other, a clutch gear 32 arranged between the forward gear 30 and the reverse gear 31, and a shift slider 33 coupled to the clutch gear 32.

The forward gear 30 and the reverse gear 31 of the clutch mechanism 26 are provided on an outer circumference of the propeller shaft 22, and arranged at an interval in the fore and aft direction (namely, the axial direction of the propeller shaft 22). The forward gear 30 and the reverse gear 31 are always engaged (meshed) with the drive gear 20 of the driveshaft 8, thereby forming a bevel gear mechanism together with the drive gear 20 of the driveshaft 8. A first driving pawl 35 is provided on an inner surface of the forward gear 30, and a second driving pawl 36 is provided on an inner surface of the reverse gear 31.

The clutch gear 32 of the clutch mechanism 26 is attached to the outer circumference of the propeller shaft 22. The clutch gear 32 is configured to move in the fore and aft direction with respect to the propeller shaft 22, and to rotate integrally with the propeller shaft 22. A first driven pawl 38, which is configured to engage (mesh) with the first driving pawl 35 of the forward gear 30, is provided on a front surface of the clutch gear 32. A second driven pawl 39, which is configured to engage (mesh) with the second driving pawl 36 of the reverse gear 31, is provided on a rear surface of the clutch gear 32.

The shift slider 33 of the clutch mechanism 26 extends in the fore and aft direction. The shift slider 33 is coupled to the clutch gear 32 via a coupling pin 40, and is configured to move integrally with the clutch gear 32 in the fore and aft direction. An engagement groove 41 is provided on an outer circumferential surface of the shift slider 33.

Figure 3:
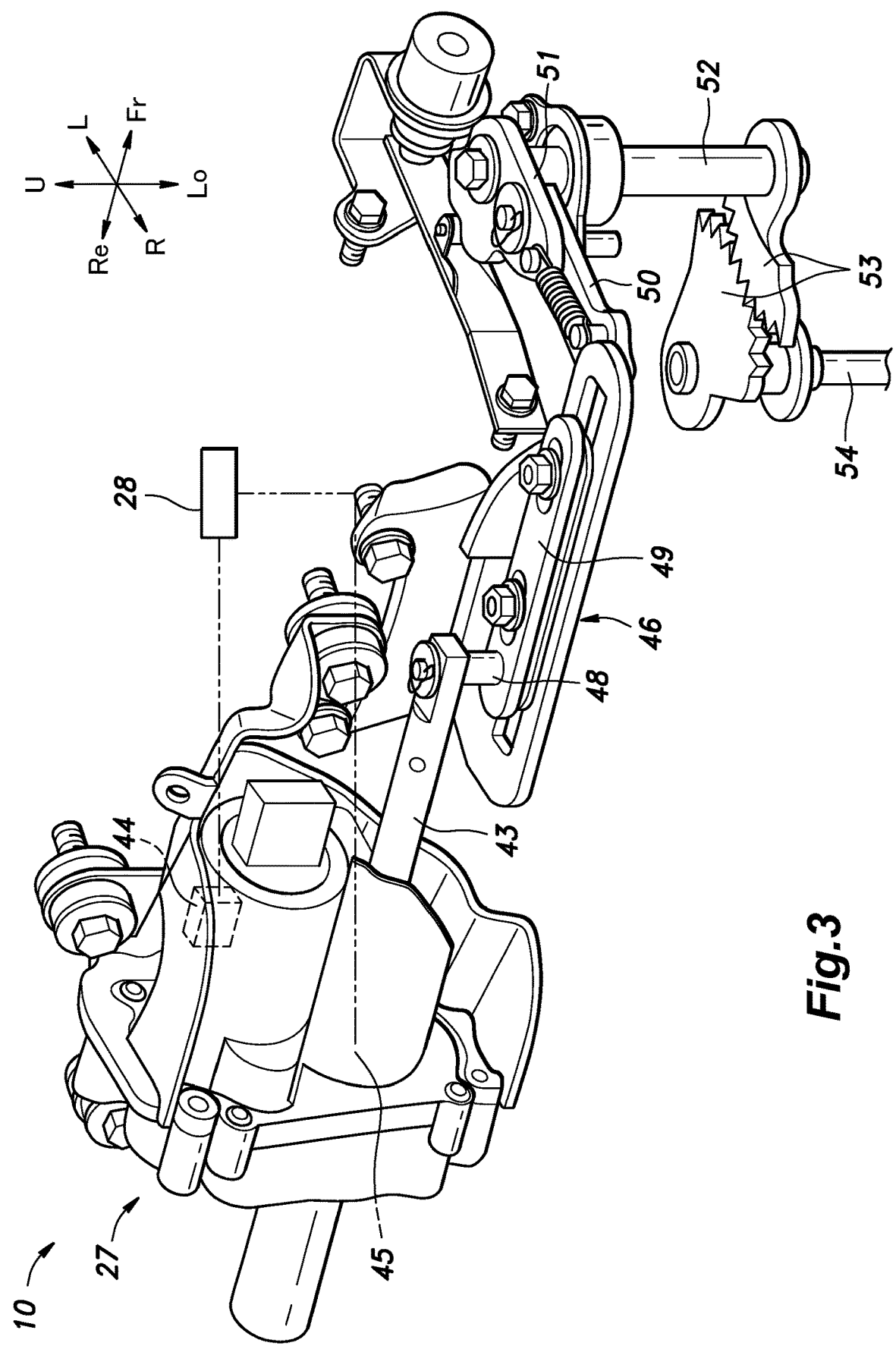
FIG. 3 is a perspective view showing a shift mechanism of the shift device according to the embodiment of the present invention.

With reference to FIG. 3, the shift mechanism 27 of the shift device 10 includes a shift rod 43 (an example of a shift actuator), a shift sensor 44 configured to directly detect the position of the shift rod 43, a shift motor 45 configured to move the shift rod 43, and a link mechanism 46 connecting the shift rod 43 and the shift slider 33.

The shift rod 43 of the shift mechanism 27 has a rod-like shape elongated in the fore and aft direction. The shift rod 43 is configured to move linearly in the fore and aft direction.

The shift sensor 44 of the shift mechanism 27 is arranged on a lateral side of the shift rod 43. For example, the shift sensor 44 consists of a potentiometer configured to output a voltage corresponding to the position of the shift rod 43.

The shift motor 45 of the shift mechanism 27 is connected to the shift rod 43 via a conversion mechanism (not shown) such as a ball screw mechanism. When the shift motor 45 rotates, the rotation of the shift motor 45 is converted into the linear motion of the shift rod 43 by the conversion mechanism.

The link mechanism 46 of the shift mechanism 27 includes a first link plate 49 attached to the shift rod 43 via an attachment rod 48, a second link plate 50 attached to the first link plate 49, a link rod 52 attached to the second link plate 50 via an attachment arm 51, and a link shaft 54 connected to the link rod 52 via a pair of link gears 53. As shown in FIG. 2, an engagement pin 55 is provided at a lower end of the link shaft 54. The engagement pin 55 is provided eccentrically with respect to the rotation center of the link shaft 54 and configured to move in the fore and aft direction as the link shaft 54 rotates. The engagement pin 55 is engaged with the engagement groove 41 of the shift slider 33.

With reference to FIG. 1, the control device 28 of the shift device 10 consists of an electronic control unit (ECU). The control device 28 is connected to an operation device 57 provided in the hull S. The operation device 57 is a device configured to accept an input operation by the user, and includes a shift lever 58. The shift lever 58 is configured to move between a first position where the shift position of the outboard motor 1 is set to "neutral", a second position where the shift position of the outboard motor 1 is set to "forward", and a third position where the shift position of the outboard motor 1 is set to "reverse".

With reference to FIG. 3, the control device 28 is connected to the shift sensor 44 and configured to identify the position of the shift rod 43 based on the signal from the shift sensor 44 (the voltage output by the shift sensor 44). The control device 28 is connected to the shift motor 45 configured to move the shift rod 43, and transmits a command signal to the shift motor 45, thereby controlling the movement of the shift rod 43.

<The Operation of the Shift Device 10>

When the user operates the shift lever 58 of the operation device 57, an electric signal corresponding to the operation of the shift lever 58 is transmitted from the operation device 57 to the control device 28. The control device 28 controls the movement of the shift rod 43 according to the electric signal from the operation device 57. Namely, the shift device 10 according to the present embodiment is a shift device of the so-called shift-by-wire type.

For example, when the user moves the shift lever 58 from the first position to the second position, the shift motor 45 is driven based on the command signal from the control device 28, and the shift motor 45 moves the shift rod 43 forward. Accordingly, the first and second link plates 49, 50 move forward, the link rod 52 rotates counterclockwise in a plan view, and the link shaft 54 rotates clockwise in the plan view. Accordingly, the engagement pin 55 of the link shaft 54 moves forward, and thus presses the shift slider 33 forward. Accordingly, the shift slider 33 and the clutch gear 32 move forward, and the first driven pawl 38 of the clutch gear 32 is engaged (meshed) with the first driving pawl 35 of the forward gear 30. In this way, the shift position of the outboard motor 1 is shifted from "neutral" to "forward".

On the other hand, when the user moves the shift lever 58 from the first position to the third position, the shift motor 45 is driven based on the command signal from the control device 28, and the shift motor 45 moves the shift rod 43 rearward. Accordingly, the first and second link plates 49, 50 move rearward, the link rod 52 rotates clockwise in the plan view, and the link shaft 54 rotates counterclockwise in the plan view. Accordingly, the engagement pin 55 of the link shaft 54 moves rearward, and thus presses the shift slider 33 rearward. Accordingly, the shift slider 33 and the clutch gear 32 move rearward, and the second driven pawl 39 of the clutch gear 32 is engaged (meshed) with the second driving pawl 36 of the reverse gear 31. In this way, the shift position of the outboard motor 1 is shifted from "neutral" to "reverse".

Further, in a case where the user moves the shift lever 58 from the second position or the third position to the first position, the shift device 10 operates reversely to the above operation. Accordingly, the shift position of the outboard motor 1 is shifted from "forward" or "reverse" to "neutral".

<The Operation of the Outboard Motor 1>

When the engine 7 is driven, the crankshaft 18 of the engine 7 rotates. The rotation of the crankshaft 18 is transmitted to the forward gear 30 and the reverse gear 31 via the driveshaft 8, and thus the forward gear 30 and the reverse gear 31 rotate in the opposite directions.

For example, in a case where the first driven pawl 38 of the clutch gear 32 is engaged with the first driving pawl 35 of the forward gear 30 (namely, in a case where the shift position of the outboard motor 1 is set to "forward"), the rotation of the forward gear 30 is transmitted to the propeller shaft 22 via the clutch gear 32, and thus the propeller 9 rotates in one direction. Accordingly, forward propulsion is applied to the hull S, and thus the hull S moves forward.

On the other hand, in a case where the second driven pawl 39 of the clutch gear 32 is engaged with the second driving pawl 36 of the reverse gear 31 (namely, in a case where the shift position of the outboard motor 1 is set to "reverse"), the rotation of the reverse gear 31 is transmitted to the propeller shaft 22 via the clutch gear 32, and thus the propeller 9 rotates in another direction opposite to the one direction. Accordingly, rearward propulsion is applied to the hull S, and thus the hull S moves rearward.

Further, in a case where the first driven pawl 38 of the clutch gear 32 is not engaged with the first driving pawl 35 of the forward gear 30 and the second driven pawl 39 of the clutch gear 32 is not engaged with the second driving pawl 36 of the reverse gear 31 (namely, in a case where the shift position of the outboard motor 1 is set to "neutral"), the rotation of the forward gear 30 and the reverse gear 31 is not transmitted to the clutch gear 32 and the propeller shaft 22, and thus the rotation of the propeller 9 is stopped. Accordingly, propulsion is not applied to the hull S, and thus the hull S is stopped.

<The Positional Relationship Between the Shift Rod 43 and the Clutch Gear 32>

Figure 4:
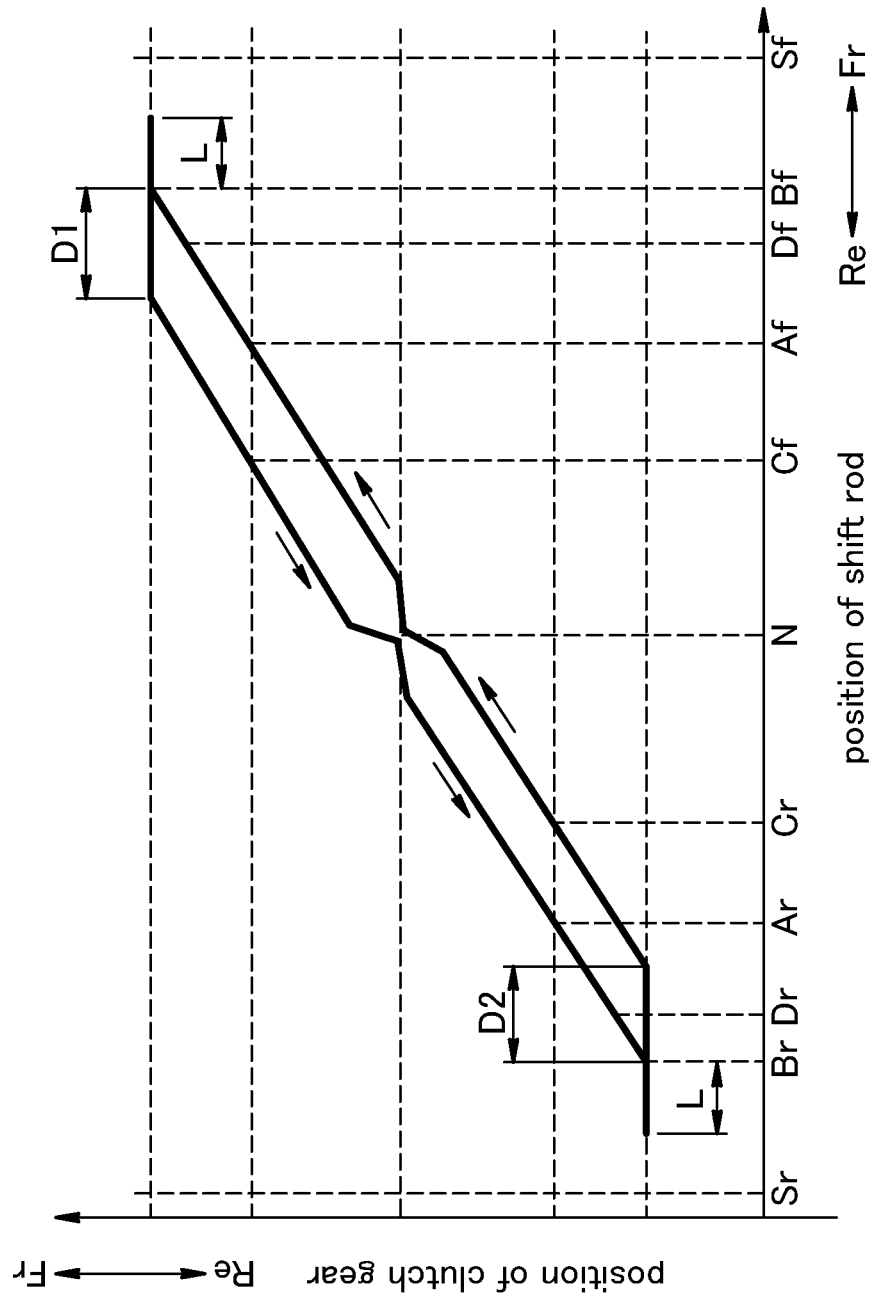
FIG. 4 is a graph showing a positional relationship between a shift rod and a clutch gear in the shift device according to the embodiment of the present invention.

With reference to FIG. 4, the shift rod 43 is configured to move in the fore and aft direction between a stopper position Sf and a stopper position Sr. The stopper position Sf is a position where the shift rod 43 abuts against a front stopper (not shown), namely, a position where the shift rod 43 moves most forward. The stopper position Sr is a position where the shift rod 43 abuts against a rear stopper (not shown), namely, a position where the shift rod 43 moves most rearward.

Figure 5A:
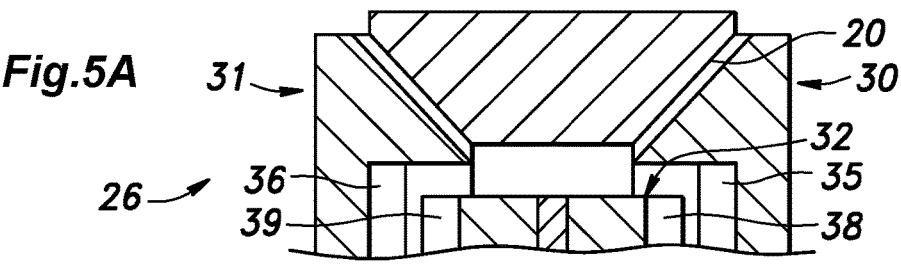
FIG. 5A is a sectional view showing the state of the clutch mechanism in the shift device in a neutral reference position N.

A neutral reference position N is set at a midpoint between the stopper position Sf and the stopper position Sr. For example, the above midpoint is a point equidistant from the stopper position Sf and the stopper position Sr. In a state where the shift rod 43 is in the neutral reference position N, the first driven pawl 38 of the clutch gear 32 is not engaged with the first driving pawl 35 of the forward gear 30 and the second driven pawl 39 of the clutch gear 32 is not engaged with the second driving pawl 36 of the reverse gear 31 (see FIG. 5A).

Figure 5B:
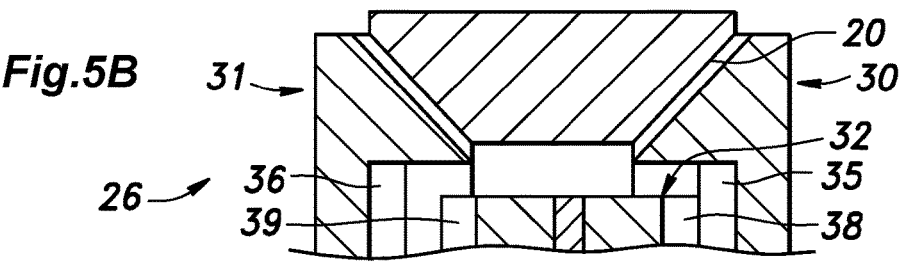
FIG. 5B is a sectional view showing the state of the clutch mechanism in the shift device in an engagement start position Af.

When the shift rod 43 moves forward from the neutral reference position N, the clutch gear 32 also moves forward accordingly. When the shift rod 43 reaches an engagement start position Af arranged more forward than the neutral reference position N, the engagement of the first driven pawl 38 of the clutch gear 32 with the first driving pawl 35 of the forward gear 30 is started (see FIG. 5B).

Figure 5C:
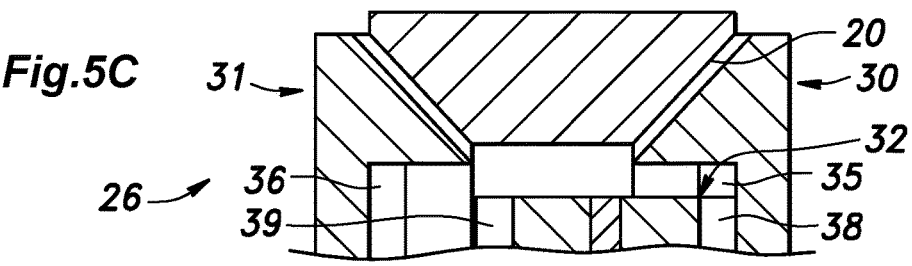
FIG. 5C is a sectional view showing the state of the clutch mechanism in the shift device in an engagement reference position Bf.

When the shift rod 43 moves forward from the engagement start position Af, the clutch gear 32 also moves forward accordingly. When the shift rod 43 reaches an engagement reference position Bf arranged more forward than the engagement start position Af, the first driven pawl 38 of the clutch gear 32 abuts against the bottom of the first driving pawl 35 of the forward gear 30 (see FIG. 5C). Namely, the engagement width with which the first driven pawl 38 of the clutch gear 32 is engaged with the first driving pawl 35 of the forward gear 30 is maximized at the engagement reference position Bf. Incidentally, the link mechanism 46, which is interposed between the shift rod 43 and the clutch gear 32, includes a deflectable component (namely, a component that can be elastically deformed). Accordingly, the shift rod 43 can be moved more forward than the engagement reference position Bf by a length L corresponding to a deflection amount of the link mechanism 46 in a state where the engagement width with which the first driven pawl 38 of the clutch gear 32 is engaged with the first driving pawl 35 of the forward gear 30 is maximized (namely, in a state where the clutch gear 32 cannot move forward any more).

On the other hand, while the shift rod 43 is moving rearward from the engagement reference position Bf by a prescribed distance D1, the clutch gear 32 is stopped. When the shift rod 43 moves rearward from the engagement reference position Bf by the prescribed distance D1 or more, the clutch gear 32 also moves rearward accordingly. When the shift rod 43 reaches a disengagement position Cf arranged more rearward than the engagement reference position Bf, the first driven pawl 38 of the clutch gear 32 is disengaged from the first driving pawl 35 of the forward gear 30 (see FIG. 5B). When the shift rod 43 moves rearward from the disengagement position Cf, the shift rod 43 is restored to the neutral reference position N (see FIG. 5A).

Figure 5D:
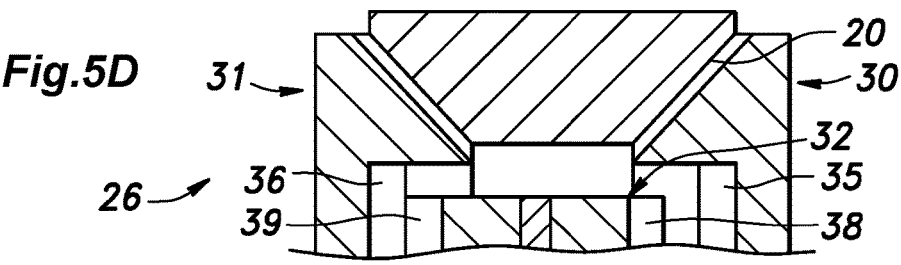
FIG. 5D is a sectional view showing the state of the clutch mechanism in the shift device an engagement start position Ar.

When the shift rod 43 moves rearward from the neutral reference position N, the clutch gear 32 also moves rearward accordingly. When the shift rod 43 reaches an engagement start position Ar arranged more rearward than the neutral reference position N, the engagement of the second driven pawl 39 of the clutch gear 32 with the second driving pawl 36 of the reverse gear 31 is started (see FIG. 5D).

Figure 5E:
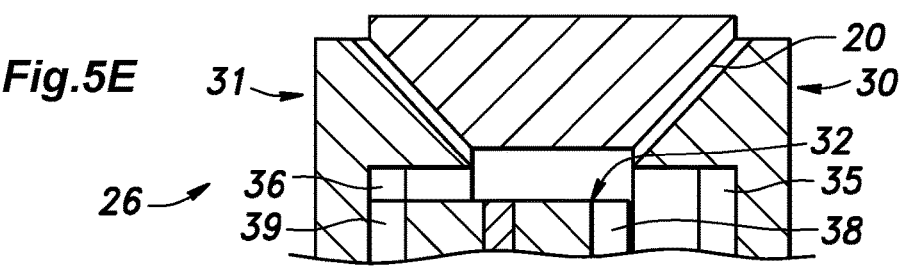
FIG. 5E is a sectional view showing the state of the clutch mechanism in the shift device in an engagement reference position Br.

When the shift rod 43 moves rearward from the engagement start position Ar, the clutch gear 32 also moves rearward accordingly. When the shift rod 43 reaches an engagement reference position Br arranged more rearward than the engagement start position Ar, the second driven pawl 39 of the clutch gear 32 abuts against the bottom of the second driving pawl 36 of the reverse gear 31 (see FIG. 5E). Namely, the engagement width with which the second driven pawl 39 of the clutch gear 32 is engaged with the second driving pawl 36 of the reverse gear 31 is maximized at the engagement reference position Br. Incidentally, the shift rod 43 can be moved more rearward than the engagement reference position Br by the length L corresponding to the deflection amount of the link mechanism 46 in a state where the engagement width with which the second driven pawl 39 of the clutch gear 32 is engaged with the second driving pawl 36 of the reverse gear 31 is maximized (namely, in a state where the clutch gear 32 cannot move rearward any more).

On the other hand, while the shift rod 43 is moving forward from the engagement reference position Br by a prescribed distance D2, the clutch gear 32 is stopped. When the shift rod 43 moves forward from the engagement reference position Br by the prescribed distance D2 or more, the clutch gear 32 also moves forward accordingly. When the shift rod 43 reaches a disengagement position Cr arranged more forward than the engagement reference position Br, the second driven pawl 39 of the clutch gear 32 is disengaged from the second driving pawl 36 of the reverse gear 31 (see FIG. 5D). When the shift rod 43 moves forward from the disengagement position Cr, the shift rod 43 is restored to the neutral reference position N.

<The Movement Control of the Shift Rod 43 by the Control Device 28>

Figure 6:
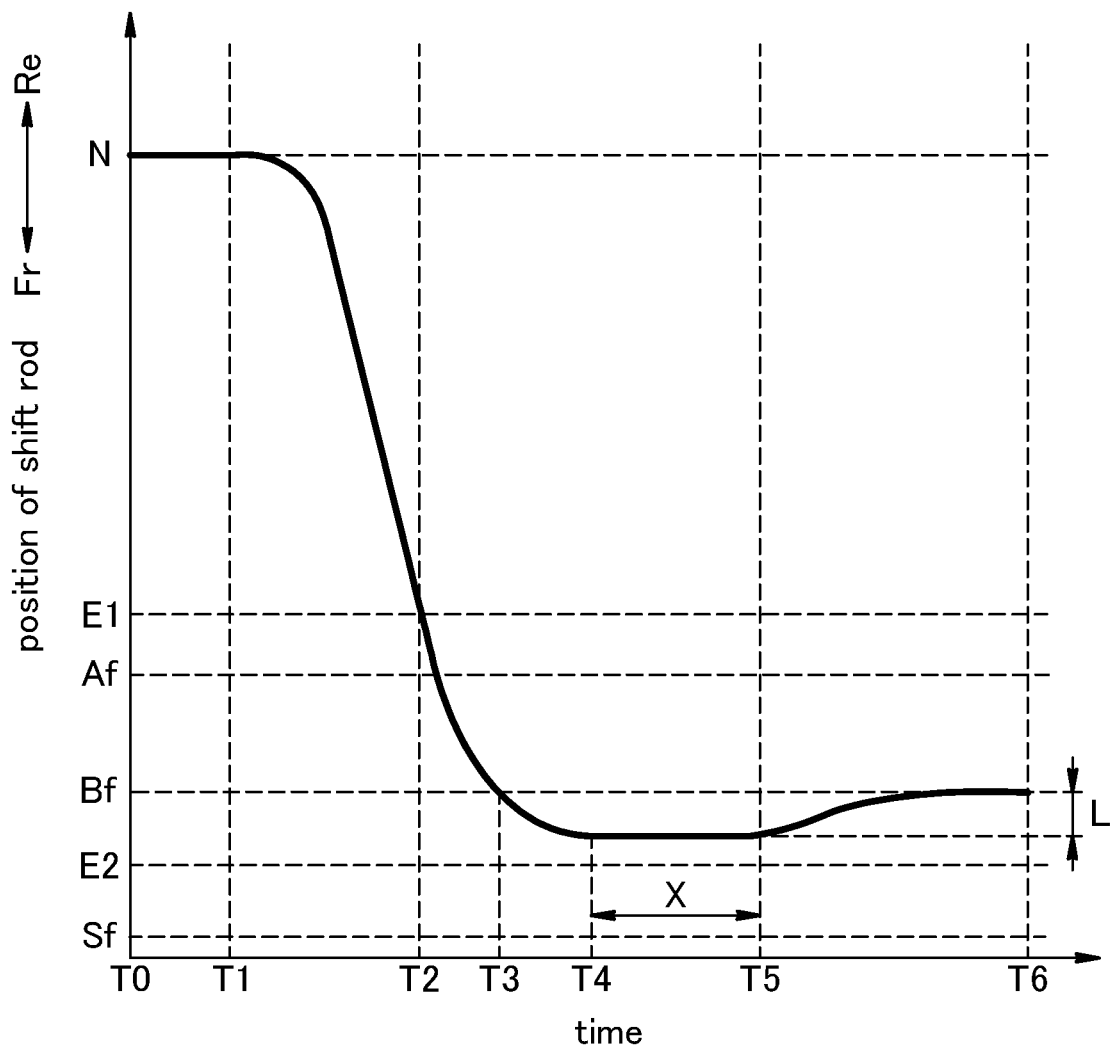
FIG. 6 is a graph showing a change in the position of the shift rod according to the embodiment of the present invention.

As shown in FIG. 6, the control device 28 sets an intermediate target position E1 between the neutral reference position N and the engagement reference position Bf. In the present embodiment, the intermediate target position E1 is a position immediately before the engagement of the clutch gear 32 with the forward gear 30 is started. Similarly, the control device 28 sets an intermediate target position (not shown) between the neutral reference position N and the engagement reference position Br. The control device 28 sets an engagement target position E2 between the engagement reference position Bf and the stopper position Sf.

In the following, the movement control of the shift rod 43 by the control device 28 will be exemplified in a case where the user moves the shift lever 58 from the first position to the second position.

From time T0 to time T1, the user keeps the shift lever 58 at the first position. Accordingly, from time T0 to time T1, the shift motor 45 is stopped and thus the shift rod 43 is stopped at the neutral reference position N.

At time T1, the user moves the shift lever 58 from the first position to the second position. Accordingly, the shift motor 45 is driven based on the command signal from the control device 28, and thus the shift motor 45 moves the shift rod 43 forward from the neutral reference position N. Until the shift rod 43 reaches the intermediate target position E1, the control device 28 keeps a movement target position of the shift rod 43 at the intermediate target position E1, and keeps a target duty ratio of the shift motor 45 at a first value. Accordingly, the shift rod 43 moves toward the intermediate target position E1 at a first target speed.

At time T2, the shift rod 43 reaches the intermediate target position E1. Accordingly, the control device 28 changes the movement target position of the shift rod 43 from the intermediate target position E1 to the engagement target position E2 and changes the target duty ratio of the shift motor 45 from the first value to a second value, which is lower than the first value. Accordingly, the shift rod 43 moves toward the engagement target position E2 at a second target speed, which is slower than the first target speed.

At time T3, the shift rod 43 reaches the engagement reference position Bf Even so, the control device 28 does not stop the shift motor 45. Accordingly, the shift motor 45 keeps on moving the shift rod 43 forward.

At time T4, the shift rod 43 moves forward from the engagement reference position Bf by the length L corresponding to the deflection amount of the link mechanism 46. Accordingly, the shift rod 43 stops moving before reaching the engagement target position E2, and thus the position of the shift rod 43 becomes stable.

At time T5, a prescribed time X elapses from time T4 (the time when the shift rod 43 stops moving). Accordingly, the shift motor 45 is stopped based on the command signal from the control device 28. Accordingly, the deflection of the link mechanism 46 is dissolved gradually, and thus the shift rod 43 gradually moves rearward.

At time T6, the deflection of the link mechanism 46 is dissolved completely. Accordingly, the movement of the shift rod 43 is stopped, and the position of the shift rod 43 becomes stable. The control device 28 stores the position of the shift rod 43 at time T6 as the engagement reference position Bf <The Effect>

As described above, in a case where the shift rod 43 moves from the neutral reference position N to the engagement reference position Bf, the control device 28 sets a target speed at which the shift rod 43 moves from the intermediate target position E1 to the engagement reference position Bf slower than a target speed at which the shift rod 43 moves from the neutral reference position N to the intermediate target position E1. Thus, the shift rod 43 can be moved slowly from the intermediate target position E1 to the engagement reference position Bf, while being moved quickly from the neutral reference position N to the intermediate target position E1. Accordingly, the shift rod 43 can be stopped at an appropriate position, so that the clutch gear 32 can be engaged with the forward gear 30 with an appropriate engagement width.

Also, the intermediate target position E1 is a position immediately before the engagement of the clutch gear 32 with the forward gear 30 is started. Thus, the shift rod 43 can be decelerated immediately before the engagement of the clutch gear 32 with the forward gear 30 is started. Accordingly, the clutch gear 32 can be engaged with the forward gear 30 reliably and smoothly, so that the clutch gear 32 and the forward gear 30 can be prevented from being damaged.

Figure 7:
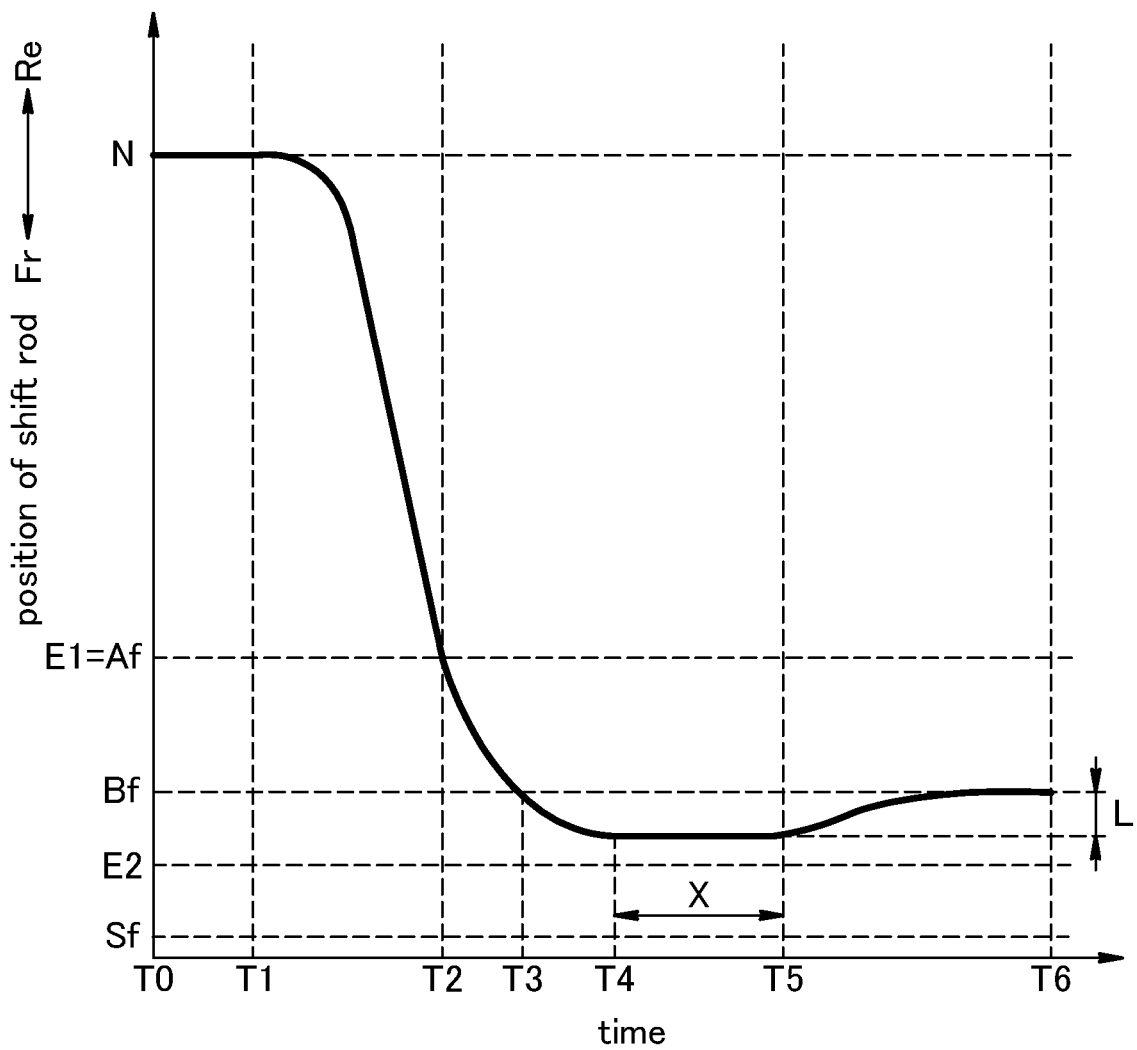
FIG. 7 is a graph showing a change in the position of the shift rod according to another embodiment of the present invention.

As shown in FIG. 7, in another embodiment, the intermediate target position E1 may be the same position as the engagement start position Af, which is a position where the engagement of the clutch gear 32 with the forward gear 30 is started. Such an embodiment has the same effect as the present embodiment.

Also, the control device 28 keeps on moving the shift rod 43 by the length L corresponding to the deflection amount of the link mechanism 46 after the shift rod 43 moves from the neutral reference position N to the engagement reference position Bf. Thus, the shift rod 43 can be reliably moved to a position where the engagement width with which the clutch gear 32 is engaged with the forward gear 30 is maximized even if the assembly positions of the components of the shift device 10 vary or the shapes of the above components change over time. Accordingly, the clutch gear 32 can be reliably prevented from being inadvertently disengaged from the forward gear 30 in a state where the shift rod 43 is in the engagement reference position Bf.

Also, the control device 28 sets a target duty ratio of the shift motor 45 during a movement of the shift rod 43 from the intermediate target position E1 to the engagement reference position Bf lower than a target duty ratio of the shift motor 45 during a movement of the shift rod 43 from the neutral reference position N to the intermediate target position E1. Thus, the movement speed of the shift rod 43 can be controlled easily and accurately.

Also, in a case where the shift rod 43 moves from the engagement reference position Bf to the neutral reference position N, the control device 28 may set a speed at which the shift rod 43 moves from the engagement reference position Bf to the intermediate target position E1 slower than a speed at which the shift rod 43 moves from the intermediate target position E1 to the neutral reference position N. Thus, the clutch gear 32 can be smoothly disengaged from the forward gear 30.

The movement control and its effect in a case where the shift rod 43 moves forward from the neutral reference position N have been described above. Such movement control can be applied to a case where the shift rod 43 moves rearward from the neutral reference position N, and has the similar effect.

<The Maintenance of the Engagement of the Clutch Gear 32 with the Forward Gear 30 or the Reverse Gear 31>

As shown in FIG. 4, the control device 28 sets an engagement maintenance position Df between the engagement start position Af and the engagement reference position Bf. The control device 28 sets an engagement maintenance position Dr between the engagement start position Ar and the engagement reference position Br.

When the outboard motor 1 is used, the shift rod 43 may return (move) from the engagement reference position Bf to the engagement maintenance position Df due to an external force (for example, water pressure) without any relationship with the command signal from the control device 28. In such a case, the control device 28 drives the shift motor 45, thereby restoring the shift rod 43 from the engagement maintenance position Df to the engagement reference position Bf. Thus, the clutch gear 32 can be reliably prevented from being inadvertently disengaged from the forward gear 30 due to the external force.

Similarly, the shift rod 43 may return (move) from the engagement reference position Br to the engagement maintenance position Dr due to the external force without any relationship with the command signal from the control device 28. In such a case, the control device 28 drives the shift motor 45, thereby restoring the shift rod 43 from the engagement maintenance position Dr to the engagement reference position Br. Thus, the clutch gear 32 can be reliably prevented from being inadvertently disengaged from the reverse gear 31 due to the external force.

Concrete embodiments of the present invention have been described in the foregoing, but the present invention should not be limited by the foregoing embodiments and various modifications and alterations are possible within the scope of the present invention.

The invention claimed is:

1. A shift device for an outboard motor, comprising:
   a forward gear and a reverse gear arranged so as to face each other;
   a clutch gear arranged between the forward gear and the reverse gear;
   a shift actuator configured to move between a neutral reference position where the clutch gear is disengaged from the forward gear and the reverse gear and an engagement reference position where the clutch gear is engaged with the forward gear or the reverse gear; and
   a control device configured to control a movement of the shift actuator,
   wherein the control device is configured to set an intermediate target position between the neutral reference position and the engagement reference position, and to set a speed at which the shift actuator moves from the intermediate target position to the engagement reference position slower than a speed at which the shift actuator moves from the neutral reference position to the intermediate target position.

2. The shift device according to claim 1, wherein the intermediate target position is a position where engagement of the clutch gear with the forward gear or the reverse gear is started.

3. The shift device according to claim 1, wherein the intermediate target position is a position immediately before engagement of the clutch gear with the forward gear or the reverse gear is started.

4. The shift device according to claim 1, further comprising a shift sensor configured to directly detect a position of the shift actuator,
   wherein the control device is configured to identify the position of the shift actuator based on a signal from the shift sensor.

5. The shift device according to claim 1, wherein the engagement reference position is a position where an engagement width with which the clutch gear is engaged with the forward gear or the reverse gear is maximized.

6. The shift device according to claim 5, further comprising:
   a shift slider coupled to the clutch gear; and
   a link mechanism connecting the shift actuator and the shift slider,
   wherein the control device keeps on moving the shift actuator by a length corresponding to a deflection amount of the link mechanism after the shift actuator moves from the neutral reference position to the engagement reference position.

7. The shift device according to claim 5, wherein the control device is configured to set an engagement maintenance position between the engagement reference position and a position where the engagement of the clutch gear with the forward gear or the reverse gear is started, and
   in a case where the shift actuator moves from the engagement reference position to the engagement maintenance position without any relationship with a command signal from the control device, the control device restores the shift actuator from the engagement maintenance position to the engagement reference position.

8. The shift device according to claim 1, further comprising a shift motor configured to move the shift actuator,
   wherein the control device is configured to set a duty ratio of the shift motor during a movement of the shift actuator from the intermediate target position to the engagement reference position lower than a duty ratio of the shift motor during a movement of the shift actuator from the neutral reference position to the intermediate target position.

9. The shift device according to claim 1, wherein the control device is configured to set a speed at which the shift actuator moves from the engagement reference position to the intermediate target position slower than a speed at which the shift actuator moves from the intermediate target position to the neutral reference position.

10. The shift device according to claim 1, wherein the control device is configured to control the movement of the shift actuator according to an electric signal from an operation device configured to accept an input operation by a user.

* * * * *